United States Patent [19]

Takano

[11] Patent Number: 4,480,732

[45] Date of Patent: Nov. 6, 1984

[54] ELECTRO-MAGNETIC CLUTCH CONTROL SYSTEM FOR AUTOMOBILES

[75] Inventor: Toshio Takano, Hamuramachi, Japan

[73] Assignee: Fuji Jukogyo Kabushiki Kaisha, Tokyo, Japan

[21] Appl. No.: 301,063

[22] Filed: Sep. 11, 1981

[30] Foreign Application Priority Data

Sep. 12, 1980 [JP] Japan ............................. 55-127699

[51] Int. Cl.$^3$ ............................................. B60K 41/28
[52] U.S. Cl. .............................. 192/0.052; 192/0.076; 192/0.092
[58] Field of Search ................. 192/21.5, 0.052, 0.075, 192/0.076, 0.092, 0.08, 3.58, 103 R; 74/866; 361/240

[56] References Cited

U.S. PATENT DOCUMENTS 2,990,927  7/1961  Steadman ..................... 192/0.052
4,091,902  5/1978  Hamada ....................... 192/0.076
4,172,505 10/1979  Rabus et al. ................. 192/0.076

FOREIGN PATENT DOCUMENTS 1405788  1/1969  Fed. Rep. of Germany ..... 192/21.5

Primary Examiner—George H. Krizmanich
Assistant Examiner—M. Manley
Attorney, Agent, or Firm—Martin A. Farber

[57] ABSTRACT

A system for controlling an electro-magnetic clutch of an internal combustion engine mounted on a vehicle, which has a drive member secured to a crankshaft of the internal combustion engine, magnetizing coil provided in the drive member, a driven member adjacent to the drive member, and a transmission secured to the driven member having multi-stage change gears. A car speed sensor is provided for producing an output signal when the speed of the vehicle exceeds a predetermined speed and a transmission sensor is provided for producing an output signal when a change gear having a small reduction ratio, such as 3rd- or 4th-gear, is selected. A pulse generator is provided for producing an output signal in proportion to the ignition pulse of the engine and an electric circuit is provided for controlling the current passing through the magnetizing coil in dependency on the output signal of the pulse generator. Output signals from the car speed sensor and the transmission sensors are applied to a gate circuit to correct the current passing through the magnetizing coil. The gate circuit is so arranged that, upon receiving the output signals, the current is decreased to provide a small clutch torque, thereby preventing car knock which can occur when driving at a relatively higher speed with a gear of small reduction ratio.

10 Claims, 8 Drawing Figures

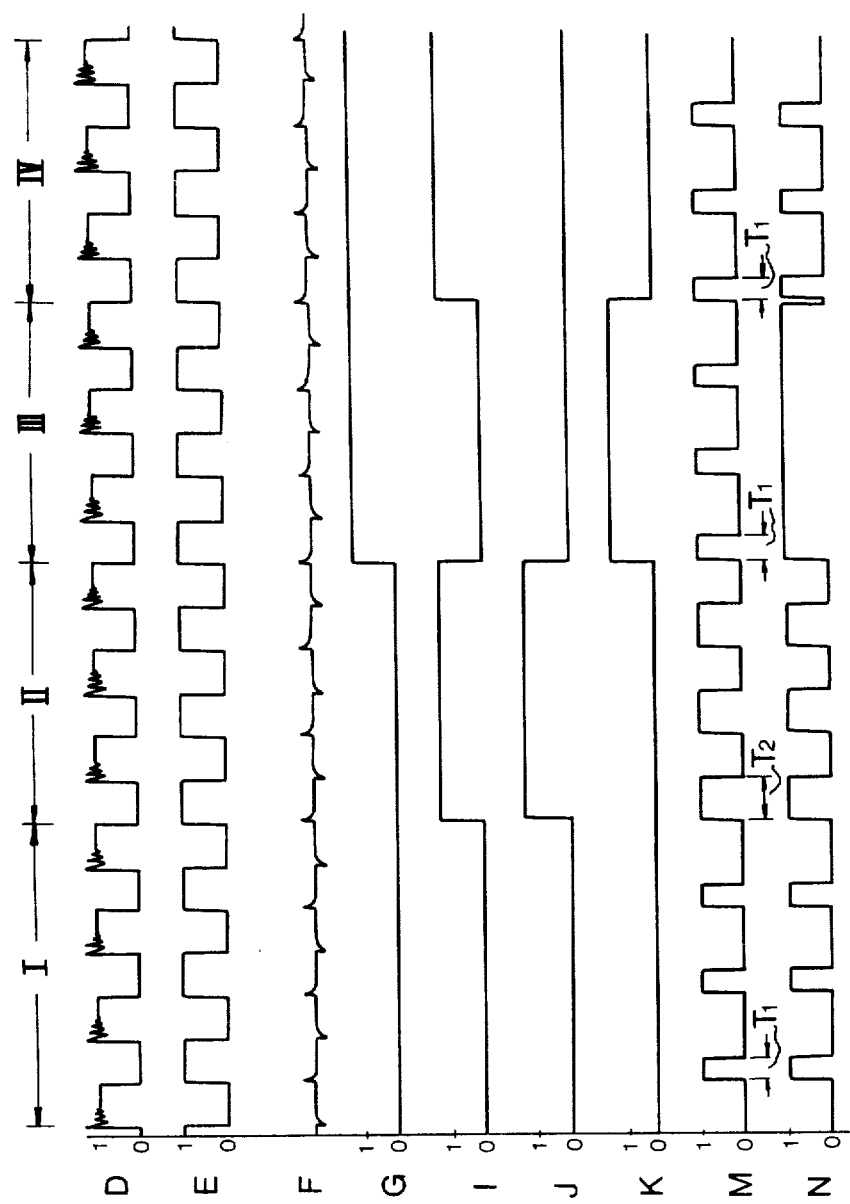

ELECTRO-MAGNETIC CLUTCH CONTROL SYSTEM FOR AUTOMOBILES

BACKGROUND OF THE INVENTION

The present invention relates to an electro-magnetic clutch control system for automobiles, and more particularly to a clutch control system for changing the characteristic of the clutch with respect to car speed to prevent car knock.

In an electro-magnetic clutch, the clutch current flows through a coil to provide an electro-magnetic field, so that two members in the transmitting system are connected magnetically with each other to transmit the power from the engine to the transmission. An electro-magnetic powder clutch is a type of the above-mentioned electro-magnetic clutch.

An electro-magnetic powder clutch comprises an annular drive member secured to the crankshaft of an engine, a driven member installed on an input shaft of the transmission spaced from and leaving a small gap relative to the drive member, a magnetizing coil provided in the one of the members, and a shift lever for shifting (i.e. changing) the gears in the transmission. The shift lever is provided with a switch for the magnetizing coil, which is actuated by operating the shift lever. When the shift lever is shifted to the gear engaging position, the switch is closed making the electric current flow through the magnetizing coil to magnetize the member having the magnetizing coil. As the accelerator pedal is depressed, the current applied to the coil increases. The magnetic powder is aggregated in the gap between the drive member and the driven member, bringing about a connection between the drive member and the driven member. The clutch current passing through the magnetizing coil progressively increases according to how far the accelerator pedal is depressed, while the clutch slips between the drive member and the driven member. Thus, the vehicle may be smoothly and easily started by depressing the accelerator pedal without operating a clutch pedal. This is a well-known technique.

SUMMARY OF THE INVENTION

An object of the present invention is to provide a system for controlling the clutch current, which can prevent knocking caused by the engagement of the clutch when driving by a small engine torque. According to the present invention, there is provided a system for controlling an electro-magnetic clutch of an internal combustion engine mounted on a car, which has a drive member secured to a crankshaft of the internal combustion engine, and a magnetizing coil provided in one of the members, a driven member adjacent to said drive member, a transmission secured to the driven member having multi-stage change gears, comprising a first sensor for producing an output signal when the speed of the car is higher than a predetermined speed, a second sensor for producing an output signal when a change gear having a small reduction ratio is selected, a generator for producing an output signal in response to the speed of the engine, an electric circuit for controlling the current passing through the magnetizing coil in dependency on the output signal, gate means responsive to said output signals from the first and second sensors for correcting the current passing through the magnetizing coil, the gate means being so arranged that, upon receiving the output signals, the current is decreased to provide a small clutch torque.

Other objects and features of the present invention will be fully described with reference to the accompanying drawings.

BRIEF DESCRIPTION OF DRAWINGS

FIG. 8 is a timing chart showing waveforms at different portions in FIG. 7.

DETAILED DESCRIPTION OF THE PREFERRED EMBODIMENT

Figure 1:
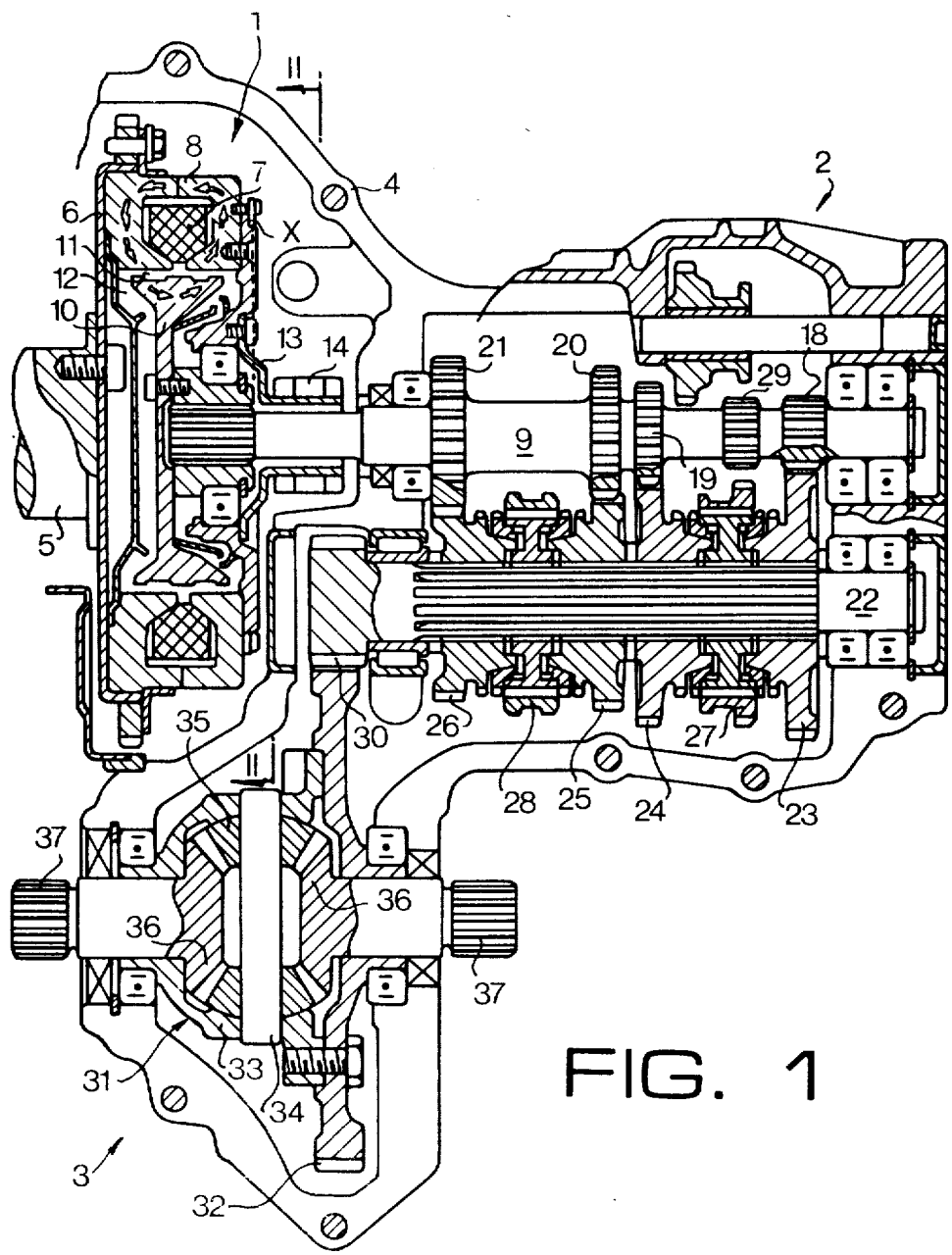
FIG. 1 is a cross-sectional view showing an example of an electro-magnetic powder clutch for automobiles.
Figure 2:
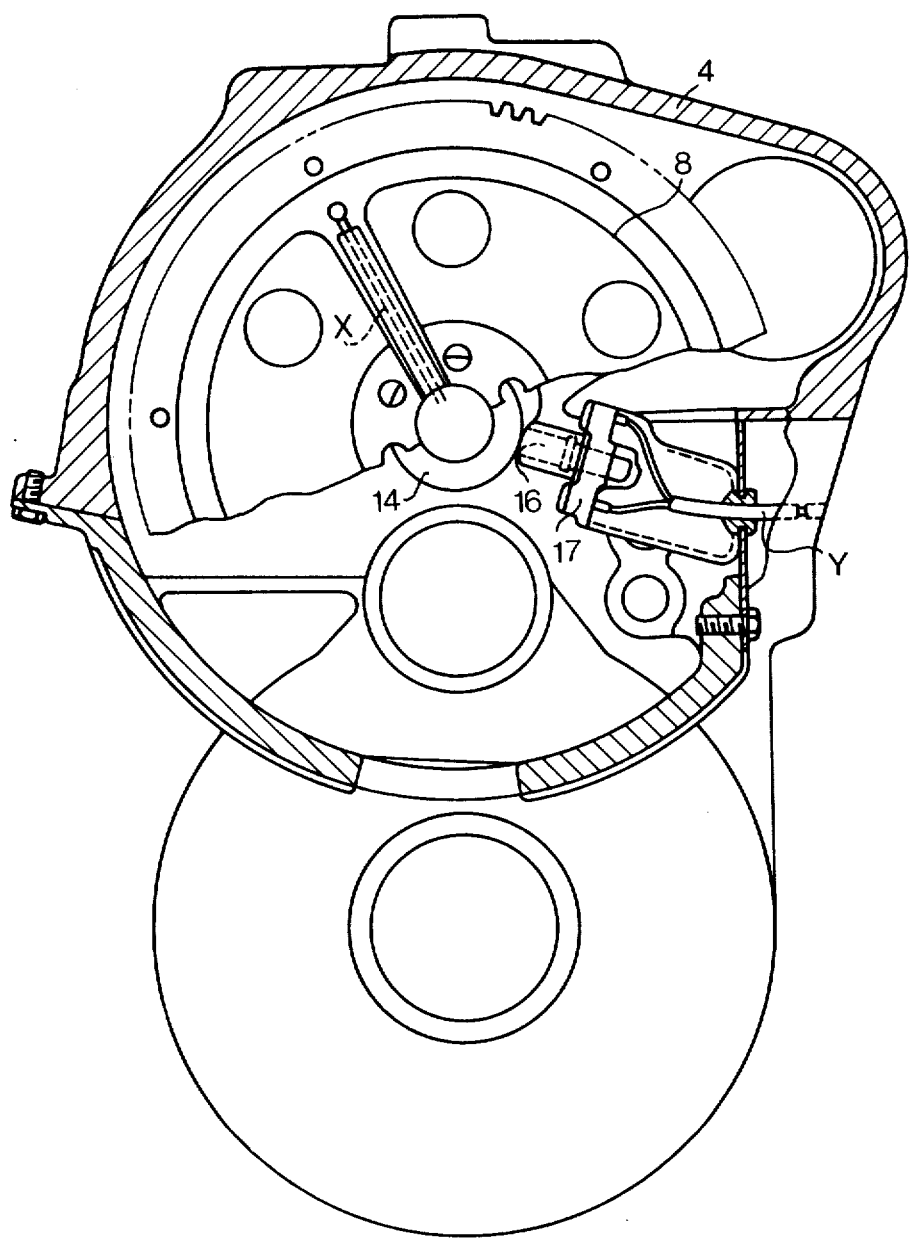
FIG. 2 is a cross-sectional view taken along a line II—II in FIG. 1.

Referring to FIGS. 1 and 2 showing a transmission for a vehicle to which the present invention is applied, an electro-magnetic powder clutch 1 is operatively connected to a four-speed transmission 2 which is connected to a final reducton device 3.

The electro-magnetic powder clutch 1 is provided in a clutch case 4 and comprises a drive plate 6 attached to the end of a crankshaft 5 of an internal combustion engine (not shown), an annular drive member 8 secured to the drive plate 6, a magnetizing coil 7 provided in the drive member 8, and a driven member 10 secured by a spline engagement to an input shaft 9 of the transmission 2, spaced from and leaving a gap 11 from the drive member 8.

Magnetic powder is provided in a powder chamber 12 and the gap 11 is filled with the powder. A cap 13 is secured to the drive member 8. The cap 13 has a cylindrical portion coaxial with the input shaft 9, on which slip rings 14 are securely provided. The slip rings 14 are connected to the drive member 8 by a lead X. Brushes 16 press against the slip rings 14 and are supported in a holder 17 and connected to a hereinafter described control means by a lead Y.

In such a construction, the drive plate 6 and the drive member 8 rotate together with the crankshaft 5 and the magnetic powder sealed in the powder chamber 12 is drawn on the inner surface of the drive member 8 by centrifugal force. If the magnetizing coil 7 is excited by the current applied through lead Y, the brushes 16, the slip rings 14 and the lead X, the drive member 8 is magnetized to produce a magnetic flux passing through the driven member 10 as shown by arrows in FIG. 1. Thus, the powder aggregates in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with the driven gears 23 to 26, respectively. The driven gears 23 to 26 are rotatably mounted on an output shaft 22 parallel to the input shaft 9. Each of the driven gears 23 and 24 is adapted to be engaged with the output shaft 22 by operating a synchromesh mechanism 27 and each of the driven gears 25 and 26 can be engaged with the output shaft 22 by a synchromesh mechanism 28 in a conventional manner. Further, a reverse drive gear means 29 is provided. Thus, by operating the shift lever (not shown) of the transmission, the driven gear 23 is jointly rotatably coupled with the output shaft 22 by the synchromesh mechanism 27 and the 1st speed is obtained on the output shaft 22 because the power of the output shaft 9 is greatly decreased. The 2nd, 3rd and 4th speed may be respectively obtained accordingly.

Further provided on one end of the output shaft 22 is an output gear 30 which engages with a ring gear 32 in a differential 31 of the final reduction device 3 to transmit the output of the output shaft 22 of the transmission 2 directly from ring gear 32 to a side gear 36 through a case 33, a spider 34 and pinions 35, and further to driving wheels (not shown) of the car through wheel shafts 37.

Figure 3:
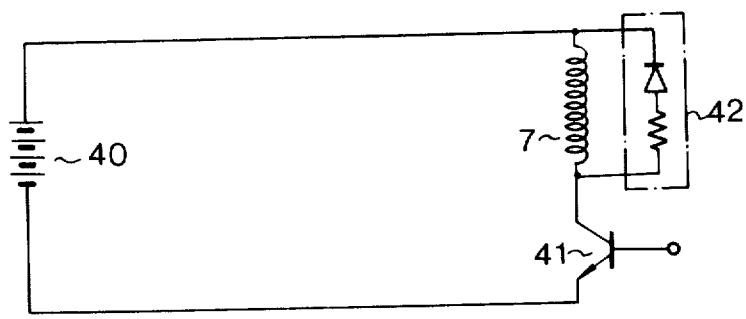
FIG. 3 is a basic circuit for controlling the clutch current.

Referring to FIG. 3, a basic electric circuit which controls the electro-magnetic powder clutch 1 is described. The coil 7 is connected at one end with a power source 40 and at the other end with the collector of a transistor 41, the emitter of which is connected to the source 40. Both ends of the coil 7 are also connected respectively with a circuit 42 which comprises a diode and a resistor. In order to electrically control the coil 7 in the circuit, the transistor 41 is applied at its base with a control signal and is switched on to allow the electric current to flow from the source 40 to the coil 7. The control signal is intermittently applied to the base of the transistor to permit intermittent switching of the transistor to control the clutch slippage. Because the frequency of the control signal is determined by the ignition pulse of the engine, the torque transmitted through the electro-magnetic powder clutch 1 depends on the engine speed.

Figure 4:
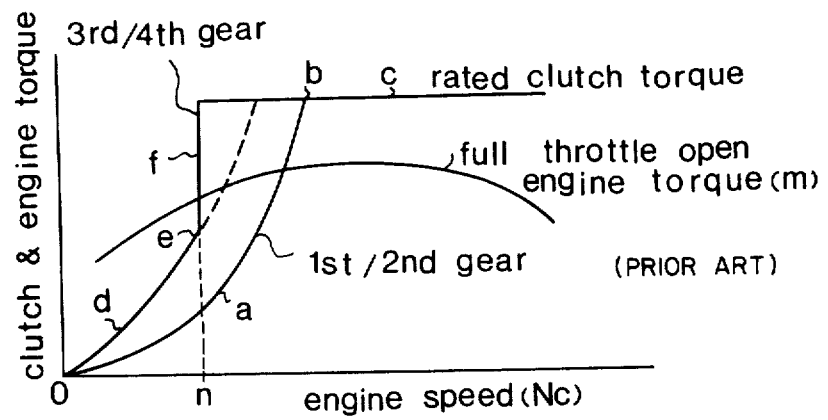
FIG. 4 is a graph illustrating clutch torque curves obtained by a conventional electro-magnetic powder clutch.

In a conventional control system for an electro-magnetic powder clutch, the clutch torque is controlled in accordance with the selected gear condition of the transmission, so as not to increase the temperature of the clutch caused by the clutch slippage at starting of the vehicle as much possible. For example, in a 4-speed transmission, when the 1st- or 2nd-gear is selected, the clutch torque varies so as to permit a smooth car start and when the 3rd- or 4th-gear is selected, the clutch torque rapidly rises, which makes starting difficult, in order to prevent a prolonged sliding engagement of the clutch which would otherwise raise the clutch temperature. The clutch torque characteristic will be further explained with reference to FIG. 4.

When the car is driven in the 1st- or 2nd-gear condition, the clutch torque varies as shown by curve a in accordance with the engine speed. The difference between the curve a and curve m of the full throttle open engine torque causes slipping of the clutch for smooth clutch engagement. When the clutch torque a reaches point b which is the rated clutch torque c of the clutch, the clutch is perfectly engaged. In the 3rd- or 4th-gear, the clutch coupling torque varies according to curve d having a steep inclination which is in an unsteady area with a low engine torque. When the car speed reaches a predetermined speed n (at about 20 km/h with 4th-gear, 1200 r.p.m.), the full engagement current flows through the coil which provides the rated clutch torque as shown by curve f, so that clutch slipping may be avoided.

Such a conventional construction is very effective for inhibiting starting in the 3rd- or 4th-gear condition and thus to reduce the temperature generation of the clutch 1. However, since the clutch is kept engaged at a speed of 20-30 km/h when driving in 4th gear, a small engine torque is transmitted to the driving wheels, which will cause knocking. Thus, the shift lever must be operated to shift-down the gear which renders the operation of the transmission complicated.

Considering the above-described defects, the present invention seeks to provide an electro-magnetic clutch control system for automobiles which is capable of varying clutch torque characteristics in accordance with the vehicle speed in 3rd- or 4th-gear to prevent temperature rise in the low vehicle speed range and to prevent knocking in the high vehicle speed range.

Figure 5:
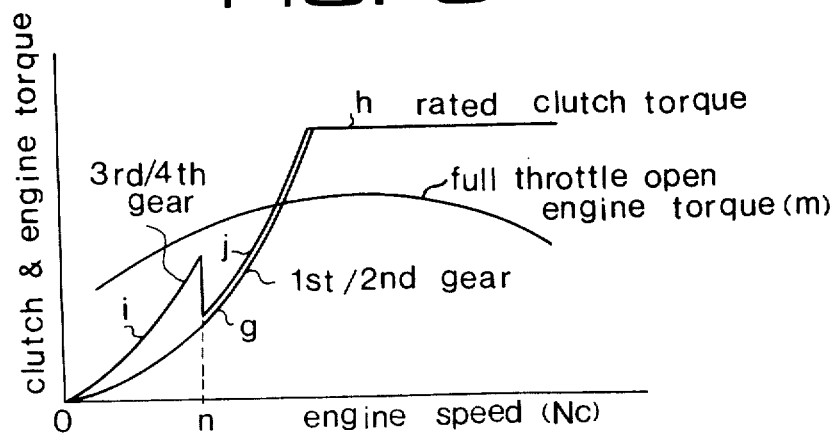
FIG. 5 is a graph illustrating torque curves obtained by an electro-magnetic powder clutch according to the present invention.

The clutch torque characteristics according to the present invention will be described with reference to FIG. 5. In 1st- or 2nd-gear, the characteristic is represented by the same curve g as the one obtained by the conventional clutch which causes slipping of the clutch. In 3rd- or 4th-gear, in the range where the vehicle speed is lower than a predetermined speed n (i.e. 20 km/h, that is at a speed of about 1200 r.p.m. of the engine in 4th-gear), the clutch characteristic is represented by a steeply rising curve as shown by i, and after the car speed is increased above the predetermined speed n, the clutch torque is decreased and controlled according to the curve j which is the same as the curve g of the 1st- or 2nd-gear. Thus, the clutch characteristic during 3rd- and 4th-gear is discontinuous at a predetermined car speed n. Accordingly, during low car speed driving the temperature increase at the starting of the car in 3rd- or 4th-gear can be prevented, that is, the driver cannot, in fact, start the car. On the other hand, when the car is driven at a high speed, the torque variation from the engine is absorbed by the slippage caused by a low clutch torque so that the car knocking can be prevented.

An embodiment of the present invention will be described with reference to the drawings.

Figure 6:
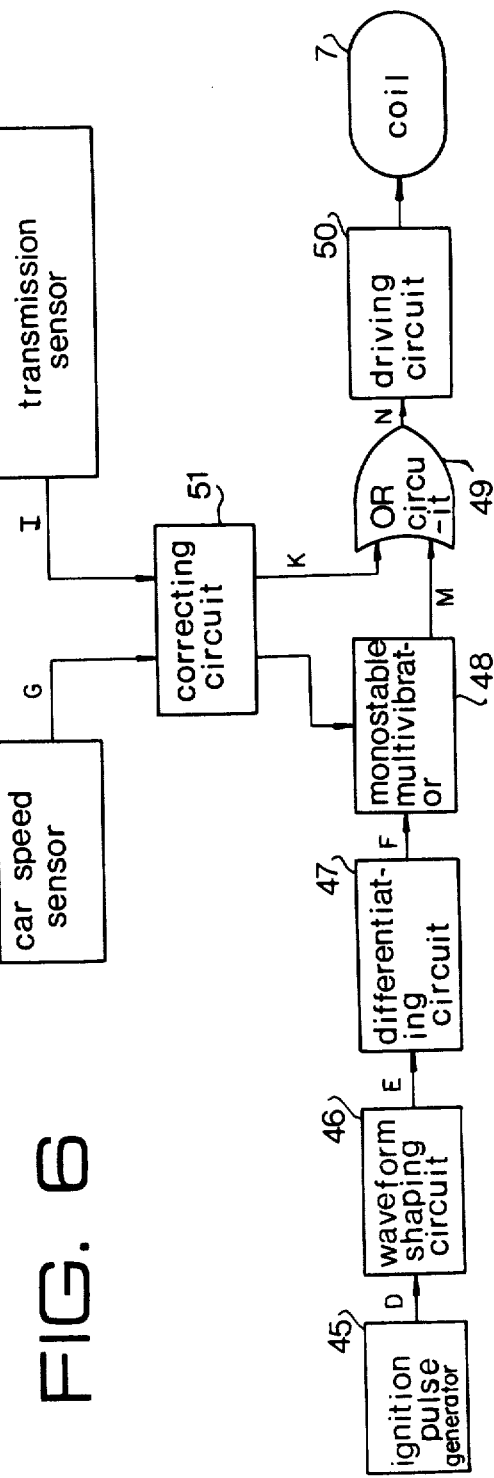
FIG. 6 is a block diagram showing a control system according to the present invention.

FIG. 6 is a block diagram showing an electro-magnetic clutch control system of the present invention. An ignition pulse generator 45 produces output pulses in proportion to the ignition pulses of the engine. Ignition pulses from the pulse generator 45 are applied to a waveform shaping circuit 46 and are further transmitted to a monostable multivibrator 48 through a differentiating circuit 47. The output of the monostable multivibrator 48 is applied to a driving circuit 50 for the coil 7 through an OR circuit 49. A car speed signal is generated from a car speed sensor 52 when the car speed is lower than a predetermined speed and a transmission sensor 53 produces a transmission signal in response to the section of the 3rd- and 4th-gears. Both signals are applied to a correcting circuit 51 which sends control signals to the monostable multivibrator 48 and the OR circuit 49.

Figure 7:
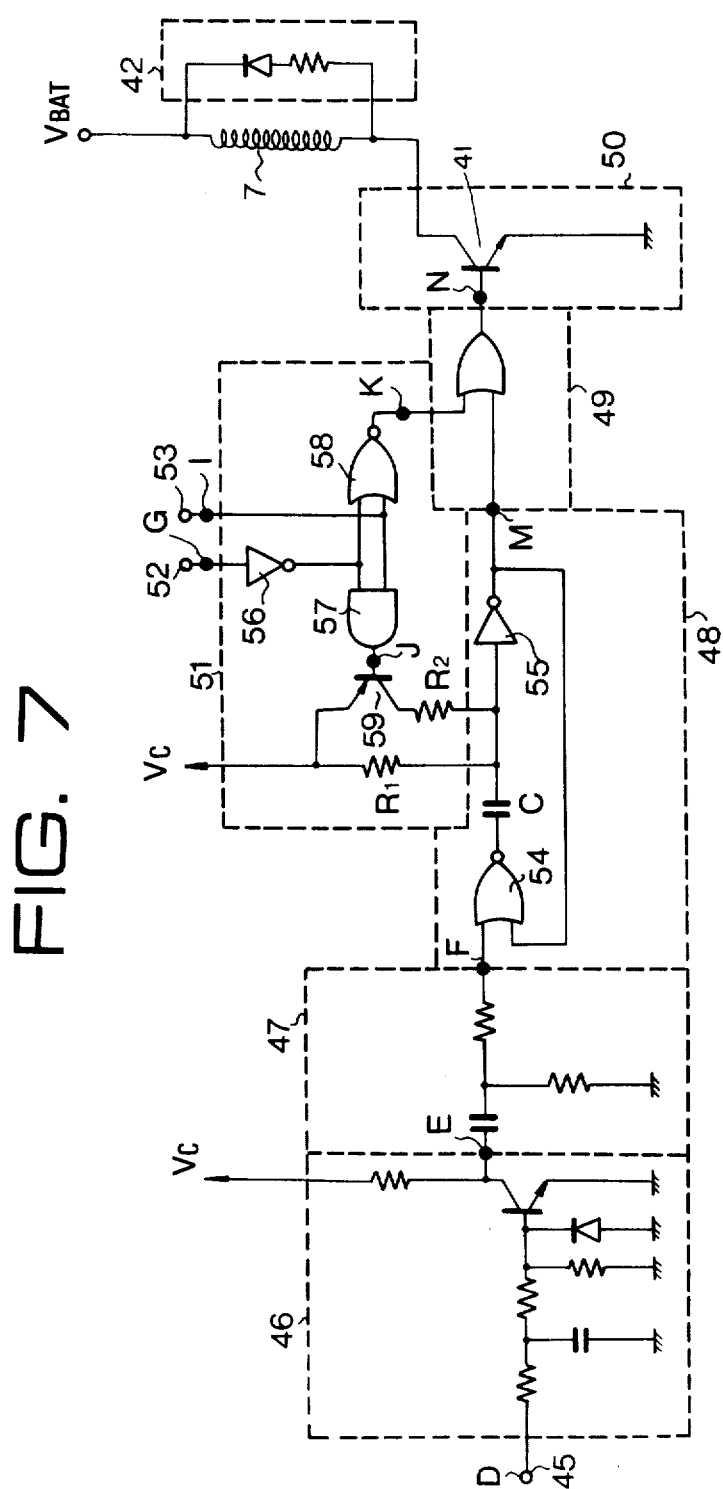
FIG. 7 is an electric circuit diagram of the same.

As shown in FIG. 7, the monostable multivibrator 48 comprises a NOR gate 54, a capacitor C, and an inverter 55. A resistor $R_1$ is connected between the monostable multivibrator 48 and a source Vc. The correcting circuit 51 comprises an inverter 56, an AND gate 57, a NOR gate 58 and a transistor 59. The car speed signal from the sensor 52 is applied to one input of both the AND gate 57 and the NOR gate 58 through the inverter 56, and the transmission signal from the sensor 53 is also applied to the other input of both the AND gate 57 and the NOR gate 58. The transistor 59 and a resistor R$_2$ are connected in series between the voltage source Vc and the inverter 55. The output of the AND gate 57 is connected to the base of the transistor 59, both outputs of the NOR gate 58 and the monostable multivibrator 48 are applied to the OR circuit 49, and the output of the OR circuit 49 is connected to the base of the transistor 41 in the driving circuit 50.

The operation of the circuit will be described with reference to the time chart shown in FIG. 8.

In the system including the circuit of FIG. 7, the clutch torque is increased in proportion to the engine speed (ignition pulses), and the car-speed signal from the sensor 52 and the transmission signal from the sensor 53 change from a low level to a high level when the car is driven at more than a predetermined speed and driven in the 3rd- or 4th-gear, respectively. The waveforms of FIG. 8 are identified by letters appearing at the corresponding circuit positions in FIGS. 6 and 7.

Range I in FIG. 8

The car is driven at a speed lower than the predetermined speed by the 1st- or 2nd-gear.

Ignition pulses D from the generator 45 are applied to the waveform shaping circuit 46 to shape each pulse into a square wave E removing the oscillations in the pulse of D. Pulses E are applied to the differentiating circuit 47, where the pulse E is differentiated and changed to waveform F which in turn is applied to the monostable multivibrator 48. The monostable multivibrator 48 is actuated to generate one pulse M upon receiving a position potential from the waveform F. The pulse M has a pulse width T$_1$ which depends on the time constant determined by the capacitance C and resistances R$_1$, R$_2$ ($T_1 = 0.69 \times C \times R_1 \cdot R_2 / (R_1 + R_2)$). The pulse M actuates (turns on) the transistor in the driving circuit 50 through the OR circuit 49, so that an intermittent current flows through the coil 7. The characteristic of the clutch torque is represented by the curve g in FIG. 5.

Range II in FIG. 8

The car is driven at a speed lower than the predetermined speed with 3rd- or 4th-gear.

Because the car-speed signal (G) from the sensor 52 is at a low level and the transmission signal (I) is at a high level, the AND gate 57 produces a high level signal (J) and the NOR gate 58 produces a low level signal (K). The high level signal from the AND gate turns off the transistor 59. The pulse M now produced by the monostable multivibrator 48 has a pulse width T$_2$ which is wider than T$_1$ ($T_2 = 0.69 \times C \times R_1$). Thus, the characteristic of the clutch torque changes to a curve i of FIG. 5 with a steep clutch torque inclination.

RANGE III of FIG. 8

The car is driven at a higher speed than the predetermined speed by the 1st- or 2nd-gear.

The car speed signal (G) from the sensor 52 is at a high level and the transmission signal (I) from the sensor 53 is at a low level. The AND gate 57 produces a low level signal (J) and the NOR gate 58 produces a high level signal (K). By the high level signal from the NOR gate 58 the OR circuit 49 produces a high level output which renders the transistor of the driving circuit 50 continuously conductive. Thus, the clutch is maintained in the engaged condition, having the characteristic h in FIG. 5.

Range IV in FIG. 8

The car is driven at a higher speed than the predetermined speed by the 3rd- or 4th-gear.

Both the car speed signal (G) and the transmission signal (I) are at high levels and both AND gate 57 and NOR gate 58 produce low level signals. Accordingly, the transistor 59 is turned on and the monostable multivibrator 48 generates pulses M with pulse width T$_1$. Thus, the clutch torque characteristic is represented by a curve j of FIG. 5, which is the same as the curve g.

In accordance with the present invention, the clutch torque is greater, when the car is driven at a lower speed than a predetermined speed by a gear having a low reduction ratio to prevent temperature increase and the clutch torque is smaller, when the car speed is higher than the predetermined speed, thus preventing knocking.

It will be understood that, although in the illustrated embodiment the discontinuous point of the clutch characteristic is set by the car speed, the same effect can be obtained by setting the point on the engine speed. In this case however as shown in FIG. 5 predetermined engine speeds must be taken into consideration.

What is claimed is:

1. In a system for controlling an electromagnetic clutch of an internal combustion engine mounted on a car, which has a drive member secured to a crankshaft of said internal combustion engine, a driven member adjacent to said drive member, a magnetizing coil in one of said members, a transmission operatively connected to said driven member and having operatively selectable change gears, the improvement comprising an engine speed sensor means for producing a first output signal when the speed of said engine is higher than a predetermined speed and inverting said first output signal when the speed of said engine is lower than the predetermined speed, a transmission sensor means for producing a second output signal when one of said change gears having a small reduction ratio is selected and inverting said second output signal when one of said change gears having a high reduction ratio is selected, an engine speed signal generator means for producing a third output signal in response to the speed of said engine, and an electric circuit comprising, a driving circuit means responsive to an input signal, the latter being dependent on said third output signal and on a correction signal, for controlling current passing through said magnetizing coil so as to control said current dependent on said third output signal and on said correction signal, a correcting circuit means including a gate circuit and an RC control circuit means, said gate circuit being responsive to said output signals from said engine speed sensor means and said transmission sensor means, respectively, and said RC control circuit means being responsive to a respective output of said gate circuit for providing said correction signal, said gate circuit and said RC control circuit means being so arranged that, upon said gate circuit receiving said first and second output signals, said correcting signal has a first value such that said current is decreased dependent on said first value and dependent on said third output signal to provide a small clutch torque, and said gate circuit and said RC control circuit means being so arranged that, upon said gate circuit receiving said second output signal and the inverted of said first output signal, said correcting signal has a second value such that said current is increased dependent on said second value and dependent on said third output signal to provide a great clutch torque.

2. In a system for controlling an electromagnetic clutch of an internal combustion engine mounted on a car, which has a drive member secured to a crankshaft of said internal combustion engine, a driven member adjacent to said drive member, a magnetizing coil in one of said members, a transmission operatively connected to said driven member and having operatively selectable change gears, the improvement comprising a car speed sensor means for producing a first output signal when the speed of said car is higher than a predetermined speed and inverting said first output signal when the speed of said car is lower than the predetermined speed, a transmission sensor means for producing a second output signal when one of said change gears having a small reduction ratio is selected and inverting said second output signal when one of said change gears having a high reduction ratio is selected, an engine speed signal generator means for producing a third output signal in response to the speed of said engine, and an electric circuit comprising, a driving circuit means responsive to an input signal, the latter being dependent on said third output signal and on a correction signal, for controlling current passing through said magnetizing coil so as to control said current dependent on said third output signal and on said correction signal, a correcting circuit means including a gate circuit and an RC control circuit means, said gate circuit being responsive to said output signals from said car speed sensor means and said transmission sensor means, respectively, and said RC control circuit means being responsive to a respective output of said gate circuit for providing said correction signal, said gate circuit and said RC control circuit means being so arranged that, upon said gate circuit receiving said first and second output signals, said correcting signal has a first value such that said current is decreased dependent on said firt value and dependent on said third output signal to provide a small clutch torque, and said gate circuit and said RC control circuit means being so arranged that, upon said gate circuit receiving said second output signal and the inverted of said first output signal, said correcting signal has a second value such that said current is increased dependent on said second value and dependent on said third output signal to provide a great clutch torque.

3. The system according to claim 2 wherein
said generator means is adapted for producing pulses in proportion to the ignition pulses of said engine.

4. The system according to claim 2 wherein
said gate circuit and said RC control circuit means steeply increase said current when said inverted first output signal of said car speed sensor means and said second output signal of said transmission sensor are received by said gate circuit.

5. The system for according to claim 2, further wherein
said gate circuit and said RC control circuit means being so arranged that, upon said gate circuit receiving the inverted said first and the inverted said second output signals, said correcting signal has said first value such that said current is decreased dependent on said first value and dependent on said third output signal to provide said small clutch torque.

6. The system for according to claim 5, wherein
said electric circuit further comprises
a monostable multivibrator operatively triggerably connected to said engine speed signal generator means and having an output constituting said input signal of said driving circuit means,
said gate circuit having inputs operatively includes a first logic gate operatively connected to said car speed sensor means and to said transmission sensor means and a transistor having a base connected to the output of said logic gate,
said RC control circuit means includes: a parallel resistor branch comprising a first resistor connected in series with said transistor and a second resistor connected in parallel with the series connection of said first resistor and said transistor; and a capacitor connected in series in said multivibrator, and said parallel resistor branch being connected between voltage and one side of said capacitor.

7. The system for according to claim 6, wherein
said gate circuit further includes a second logic gate having inputs operatively connected to said car speed sensor means and to said transmission sensor means,
said electric circuit further includes an OR gate having inputs connected to the outputs of said second logic gate and said multivibrator and an output connected to said driving circuit means, and
said driving circuit means comprises a transistor having a base connected to the output of said OR gate and said transistor is connected in series with said magnetizing coil.

8. The system for according to claim 6, wherein
said first logic gate is an AND gate.

9. The system for according to claim 7, wherein
said second logic gate is a NOR gate.

10. The system for according to claim 9, wherein
said monostable multivibrator includes a NOR gate and an invertor connected in series to said capacitor, one of the inputs of said NOR gate of said multivibrator being connected to the output of said invertor, and wherein
said electric circuit further includes a differentiating circuit connected between said other input of said NOR gate and said engine speed signal generating means.

* * * * *